US012170177B2

(12) United States Patent
Widtmann et al.

(10) Patent No.: US 12,170,177 B2
(45) Date of Patent: Dec. 17, 2024

(54) ISOLATING GROUND SWITCH

(71) Applicant: MacLean Power, L.L.C., Fort Mill, SC (US)

(72) Inventors: Matthew A. Widtmann, Wood Dale, IL (US); Adam P. Cook, Wood Dale, IL (US); Cole J. Blazer, Menomonee Fall, WI (US)

(73) Assignee: MacLean Power, L.L.C., Fort Mill, SC (US)

( * ) Notice: Subject to any disclaimer, the term of this patent is extended or adjusted under 35 U.S.C. 154(b) by 0 days.

(21) Appl. No.: 16/913,381

(22) Filed: Jun. 26, 2020

(65) Prior Publication Data

US 2021/0407749 A1 Dec. 30, 2021

(51) Int. Cl.
*H01H 19/14* (2006.01)
*H01H 19/04* (2006.01)

(52) U.S. Cl.
CPC ............ *H01H 19/04* (2013.01); *H01H 19/14* (2013.01)

(58) Field of Classification Search
CPC ........ H01H 19/14; H01H 19/04; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS

| | | | | |
|---|---|---|---|---|
| 1,537,272 A | | 5/1925 | Sweet | |
| 4,779,305 A | | 10/1988 | Gorsek | |
| 5,008,498 A | * | 4/1991 | Yamazaki | H01H 19/11 200/11 R |
| 5,315,077 A | * | 5/1994 | Simon | H01H 19/63 200/569 |
| 5,571,999 A | * | 11/1996 | Harris | H01H 19/52 200/565 |
| 6,299,474 B2 | * | 10/2001 | Daoud | H01R 4/2433 439/409 |
| 6,326,905 B1 | * | 12/2001 | Walters | H01H 19/585 341/1 |
| 6,639,168 B1 | * | 10/2003 | Castonguay | H01H 3/60 335/46 |
| 7,429,710 B2 | | 9/2008 | Gutalj et al. | |

(Continued)

FOREIGN PATENT DOCUMENTS

EP 1666312 A1 * 6/2006 ............ B60R 21/09

*Primary Examiner* — Ahmed M Saeed
(74) *Attorney, Agent, or Firm* — Brooks Kushman P.C.

(57) ABSTRACT

An isolation ground switch has a housing having a front housing portion and a back housing portion defining a housing cavity therebetween. A conductive switch plate is positioned in the housing cavity and rotatable between a closed position and an open position. A plurality of termination studs are mounted to the front housing portion, each termination stud having a conductive projection extending into the housing cavity. The conductive projection of each termination stud engages the switch plate when the switch plate rotates to the closed position, and when the switch plate rotates to the open position, the switch plate does not contact the termination studs and is conductively isolated.

19 Claims, 3 Drawing Sheets

(56) References Cited

U.S. PATENT DOCUMENTS

| | | | | |
|---|---|---|---|---|
| 8,647,159 | B2 | 2/2014 | Steeves | |
| 9,728,354 | B2 | 8/2017 | Skolozdra et al. | |
| 2007/0175742 | A1* | 8/2007 | Wong | H01H 19/10 200/179 |
| 2011/0134575 | A1* | 6/2011 | Ward | H02H 5/042 361/42 |
| 2015/0144468 | A1* | 5/2015 | Skolozdra | H01H 31/003 200/16 R |
| 2020/0090887 | A1* | 3/2020 | Son | H01H 19/11 |

* cited by examiner

ISOLATING GROUND SWITCH

TECHNICAL FIELD

This disclosure relates to a switch for grounding and isolating the different conductive wires for testing.

BACKGROUND

Wires and harnesses of an electrically conductive line are bonded at a termination point and to provide for a ground connection at this point. The termination point bonds and grounds several electrically conductive lines at a common location. When a specific line needs to be tested or traced, that specific line must be isolated. However, termination points typically do not provide a way to easily disconnect or isolate the conductive lines from one another without removing each bonded connection and then reattaching after testing is finished, which is time consuming and inefficient.

SUMMARY

According to at least one embodiment, an isolation ground switch has a housing having a front housing portion and a back housing portion defining a housing cavity therebetween. A conductive switch plate is positioned in the housing cavity and rotatable between a closed position and an open position. A plurality of termination studs are mounted to the front housing portion, each termination stud having a conductive projection extending into the housing cavity. The conductive projection of each termination stud engages the switch plate when the switch plate rotates to the closed position, and when the switch plate rotates to the open position, the switch plate does not contact the termination studs and is conductively isolated.

In another embodiment, the ground switch has a rotation hub connected to the switch plate that extends outside the housing cavity to allow a user to rotate the switch plate between the open and closed positions.

In another embodiment, the rotation hub extends through an opening defined in the front housing portion.

In another embodiment, the rotation hub is connected to the switch plate such that the switch plate rotates about a central axis of the hub.

In another embodiment, the rotation hub comprises a bolt connected to the switch plate with threads.

In another embodiment, the rotation hub includes a handle.

In another embodiment, the front housing portion has indicia indicating a first rotation direction toward the open position and a second rotation direction toward the closed position.

In another embodiment, the termination studs are integrally molded with the front housing portion.

In another embodiment, the switch plate has a plurality of tabs positioned along a periphery of the switch plate, one of the tabs contact each termination stud when the switch plate rotates to the closed position.

According to at least one embodiment, an isolation ground switch having a housing having a front housing portion and a back housing portion defining a housing cavity therebetween. A conductive switch plate is positioned in the housing cavity and moveable between a closed position and an open position, the conductive switch plate having a plurality of contact points positioned along a periphery of the switch plate a plurality of termination studs mounted to the front housing portion, each termination stud having a conductive projection extending into the housing cavity. One of the contact points along the periphery of the switch plate contacts each of the conductive projections of the termination stud when the switch plate moves to the closed position, and when the switch plate moves to the open position, the switch plate does not contact the termination studs and is conductively isolated.

In another embodiment, the switch plate deflects along at each of the contact points when contacting a corresponding conductive projection, thereby creating a spring force to ensure the contact points maintain contact with the conductive projections in the closed position.

In another embodiment, the contact points comprise a plurality of tabs defined along the periphery and projecting radially from adjacent peripheral edges.

In another embodiment, the peripheral edges are concave between the tabs.

In another embodiment, the conductive projection of each termination stud projects into the housing cavity such that the conductive projection intersects a plane in which the switch plate rotates.

In another embodiment, the switch plate has two recessed detents and the front housing portion has a pin projecting into the housing cavity, the pin engaging a first recessed detent in the open position and engaging a second recessed detent in the closed position to positively secure the switch plate in the open and closed positions.

According to at least one embodiment, an isolation ground switch has a housing having a front housing portion and a back housing portion defining a housing cavity therebetween, the housing having a plurality of termination studs integrally formed with the front housing portion. Each termination stud has a conductive projection extending into the housing cavity. A conductive switch plate is positioned in the housing cavity and moveable between a closed position and an open position. The conductive projection of each termination stud contacts the switch plate when the switch plate moves to the closed position, and when the switch plate moves to the open position, the switch plate does not contact the termination studs and is conductively isolated.

In another embodiment, the conductive projection is insert molded with the front housing.

In another embodiment, the termination studs are a conductive material and insert-molded with a non-conductive material to form the front housing.

In another embodiment, the conductive projection of each termination stud has a tapered edge adjacent a planar distal end parallel to a plane in which the switch plate moves.

In another embodiment, the conductive projection of each termination stud projects into the housing cavity such that the conductive projection intersects a plane in which the switch plate rotates.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
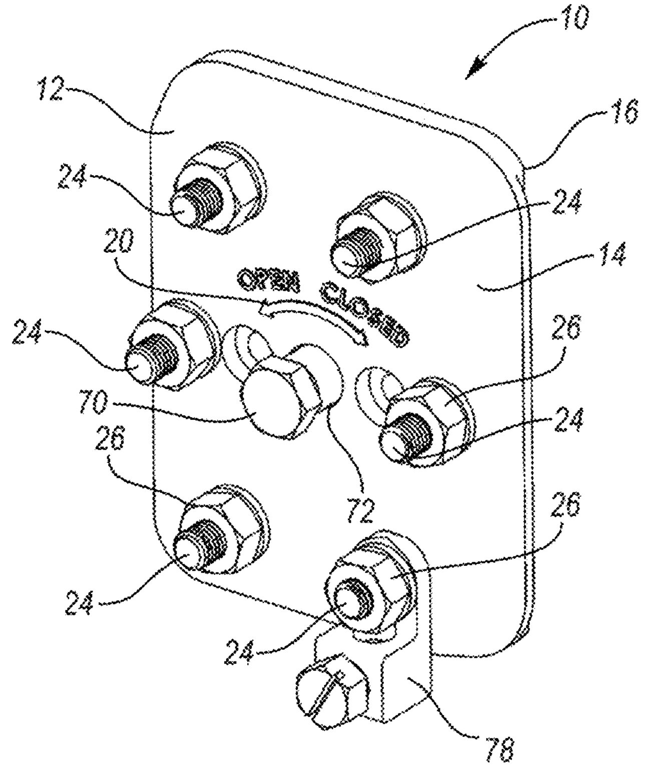
FIG. 1 is an isometric perspective view of the isolation ground switch.

With references to the Figures, FIG. 1 illustrates an isolation ground switch 10 according to one embodiment. The ground switch 10 may be used with a termination point to disconnect or isolate the conductive lines from each another and allow location of each wire. Such termination points are often located at or in utility marker posts, vaults, cabinets, manholes, pedestals and other enclosures. The lines may serve as communication lines or markers for water lines, gas lines and power lines. When a specific line is to be tested or traced, it is necessary to isolate that line. The isolation ground switch 10 allows easy isolation of the lines without removing the bonded connection for each of the lines being tested or traced.

Figure 2:
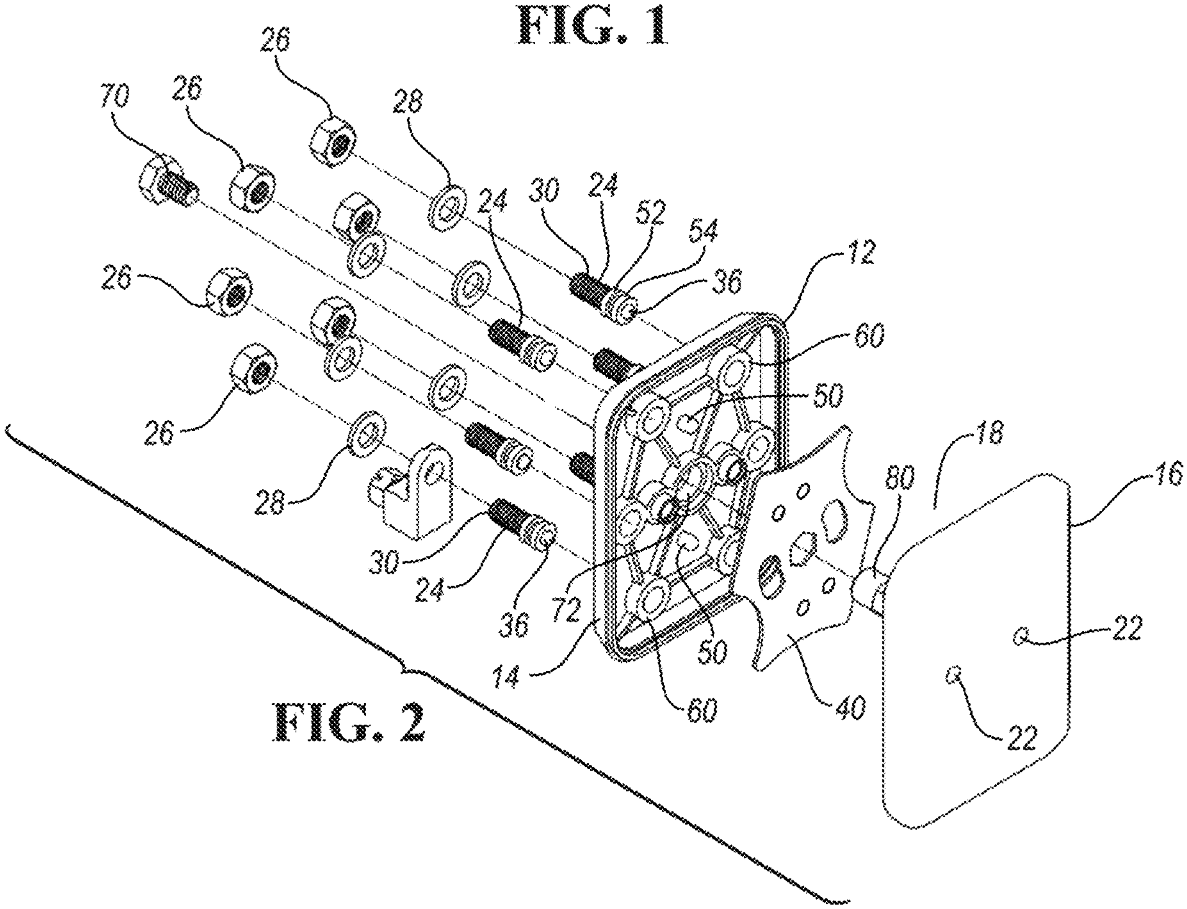
FIG. 2 is an exploded isometric rear view of the isolation ground switch illustrating all of the components in more detail

As illustrated in FIGS. 1-2, the isolation ground switch 10 is contained in a housing 12 having a front housing portion 14 and a back housing portion 16. The front housing portion 14 and back housing portion 16 of the housing 12 may each be molded of plastic. For example, the front housing portion 14 and back housing portion 16 may be molded of a thermoplastic of polybutylene terephthalate (PBT) or glass-filled PBT. The housing 12 may also be formed of other non-conductive materials, or other suitable composites or materials. The housing 12 may be generally rectangular and the front housing portion 14 and back housing portion 16 can be joined together to define a housing cavity 18 for a switch plate 40.

The housing 12 may include mounting features 22 for mounting the isolation ground switch 10 to a marker post, underground test stations, underground vaults and other surfaces. As shown, in FIG. 2, the mounting features 22 may be mounting holes formed on the back housing 16 and front housing 14. The housing 12 may also include other mounting features such as brackets, flanges or other hardware.

The front housing portion 14 and the back housing portion 16 may be joined utilizing ultrasonic welding operations. The front housing portion 14 and back housing portion 16 may have tongue and groove features along adjacent edges that interlock and ensure optimal joint strength from the ultrasonic welding operation.

As illustrated in FIG. 1, the front housing portion 14 may have indicia 20 indicating a first rotation direction toward the open position and a second rotation direction toward the closed position.

The front housing portion 14 may have a plurality of termination studs 24. Conductive wires utilized for tracing applications are attached to the termination studs 24. The termination studs 24 may have a threaded portion 30 and the wiring harness may be attached with a nut 26 and washer 28, for example. In one example, the threaded portion 30 may have ¼-28 thread. The threaded portion 30 of the termination stud 24 extends away from the housing 12 for joining to a wiring harness. As illustrated, the isolation ground switch 10 includes six termination studs 24, however, any suitable number of termination studs may be provided.

In one embodiment, the termination studs 24 may be integrally formed with the front housing portion 14. For example, the termination studs 24 may be an insert that is injection molded with the front housing 14. The termination stud 24 may be formed of a conductive material and the front housing 14 is molded of non-conductive material. The termination stud 24 may be inserted in the mold and molded with the housing material to form the front housing assembly that does require additional processes to join the termination stud 24 to the front housing 14. FIG. 2 illustrates an exploded view, however, the integrally formed front housing assembly could not separate the terminal studs 24 from the front housing portion 14 as depicted in such an exploded illustration.

The termination stud 24 has a conductive projection 36 that projects into the housing cavity 18. The conductive projection 36 extends into the cavity 18 to intersect a plane defined by the switch plate 40. In the closed position, the switch plate 40 is in contact with the conductive projections 36. In the open position, the switch plate 40 does not contact the conduction projections 36 of the termination studs 24.

Figure 4:
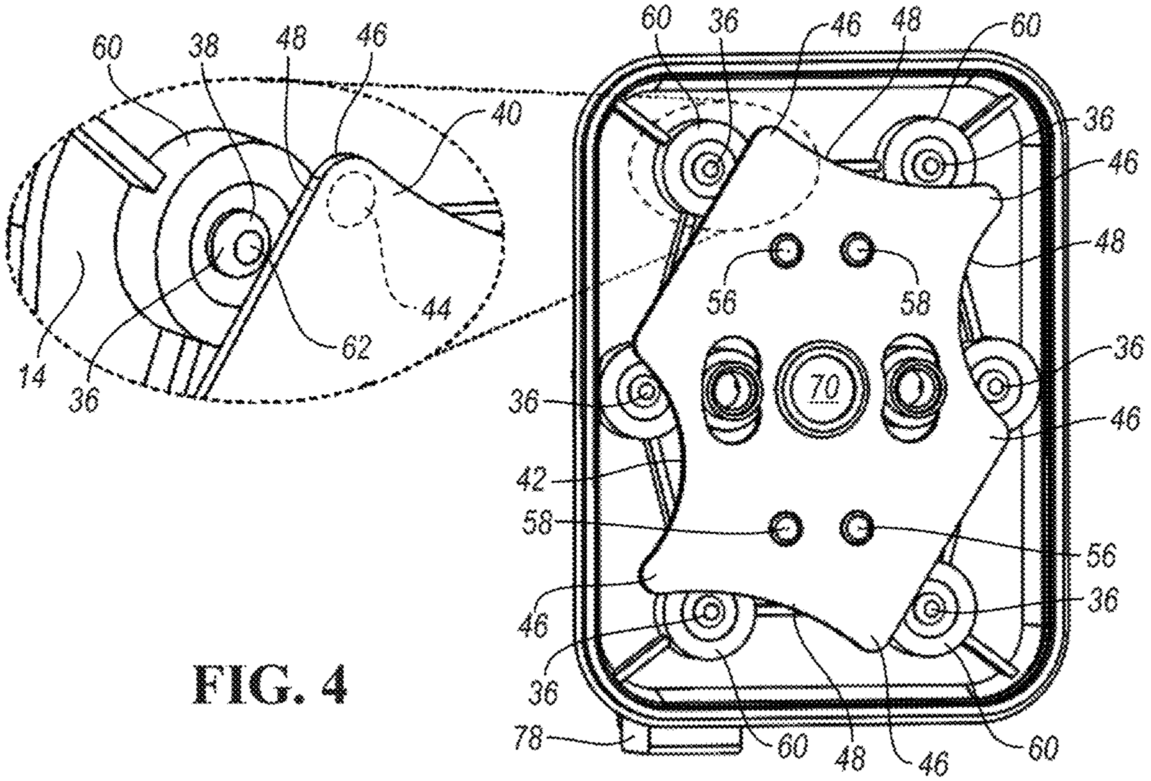
FIG. 4 the isolation ground switch moving toward the closed position with the back housing removed.

As shown in FIG. 4, as the switch plate 40 rotates toward the closed position, the switch plate 40 contacts a side wall 38 of the conductive projection 36. Then, as the switch plate 40 continues to rotate, the switch plate 40 deflects rearward until it reaches the closed position. In the closed position, the switch plate 40 contacts a distal end 62 of the conductive projection 36. The distal end 62 may be a generally flat surface to provide good conductive contact with the switch plate 40 in the closed position.

As illustrated, the conductive projection 36 of each termination stud 24 may be a generally domed projection. The conductive projection 36 may have a profile that urges the switch plate 40 to deflect as it rotates to the closed position. As illustrated, the conductive projection 36 may be shaped with tapered side walls 38 connecting to the contact plane at the distal end 62 of the termination stud 24. In other embodiments, the shape of the conductive projection 36 may be ramped, chamfered, conical, frustoconical, or any suitable shape or profile.

The termination studs 24 may have a knurled region 52 and undercut region 54 that engages retaining features on a boss 60 formed with the front housing 14 to ensure termination studs 24 withstand required compression, tensile and torsional forces as the switch plate 40 contact the conductive projections 36 when the rotating between the open position and the closed position.

The switch plate 40 may be made of a conductive copper alloy, or suitable conductive material. The switch plate 40 has a perimeter shape or periphery 42 designed allow the switch plate 40 to contact the conductive projections 36 in the closed position and to disengage and prevent contacting the conductive projections 36 as the switch plate 40 rotates to the open position during the isolated state. The complex perimeter shape 42 also ensures smooth transition and constant contact in the closed operation state. The thickness of the switch plate 40 ensures adequate current capacity in the closed state of operation, or grounded state.

Figure 3:
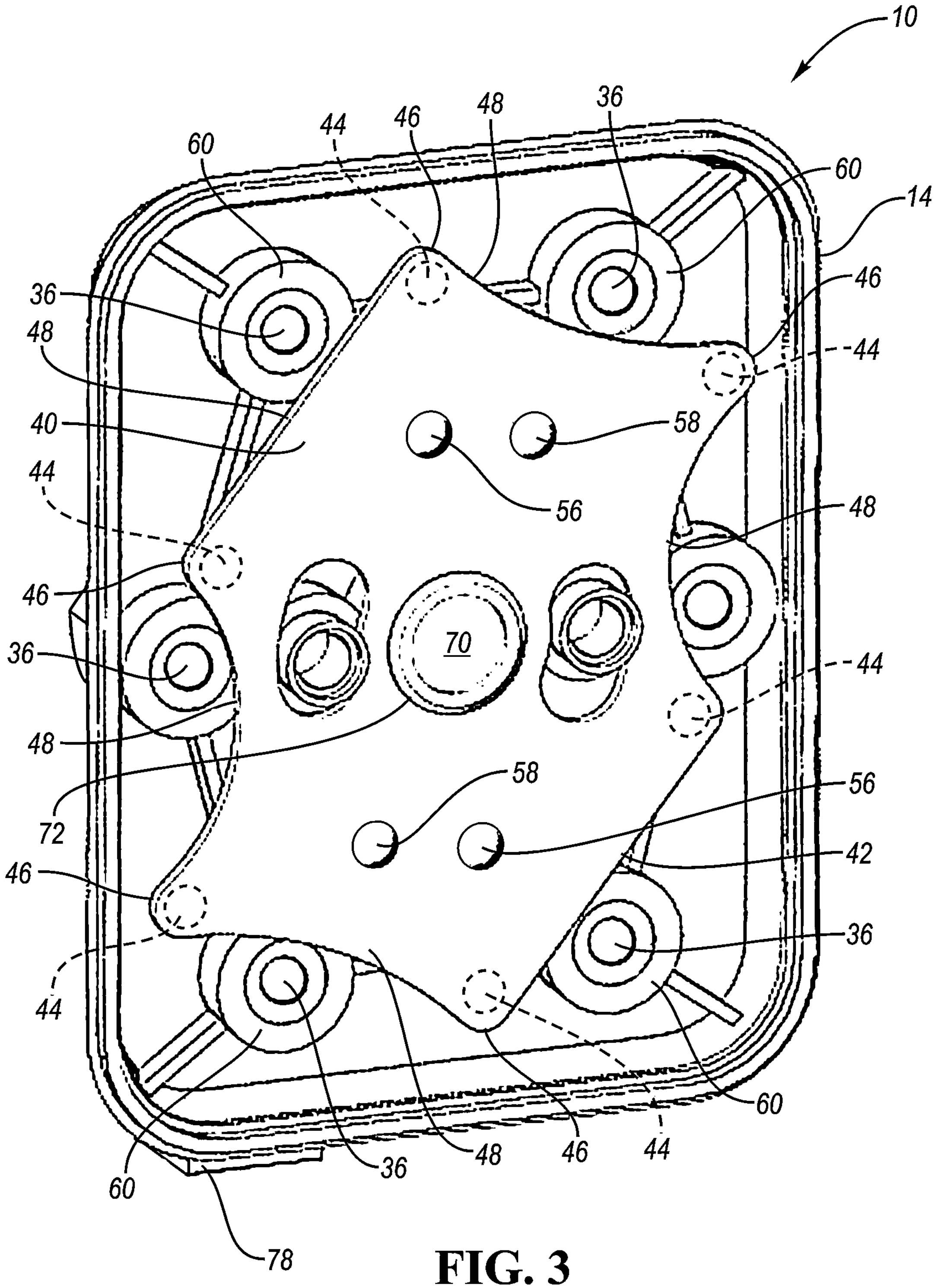
FIG. 3 is rear perspective view of a portion of the isolation ground switch in an open position and with the back housing removed to illustrate some of the components in more detail.
Figure 5:
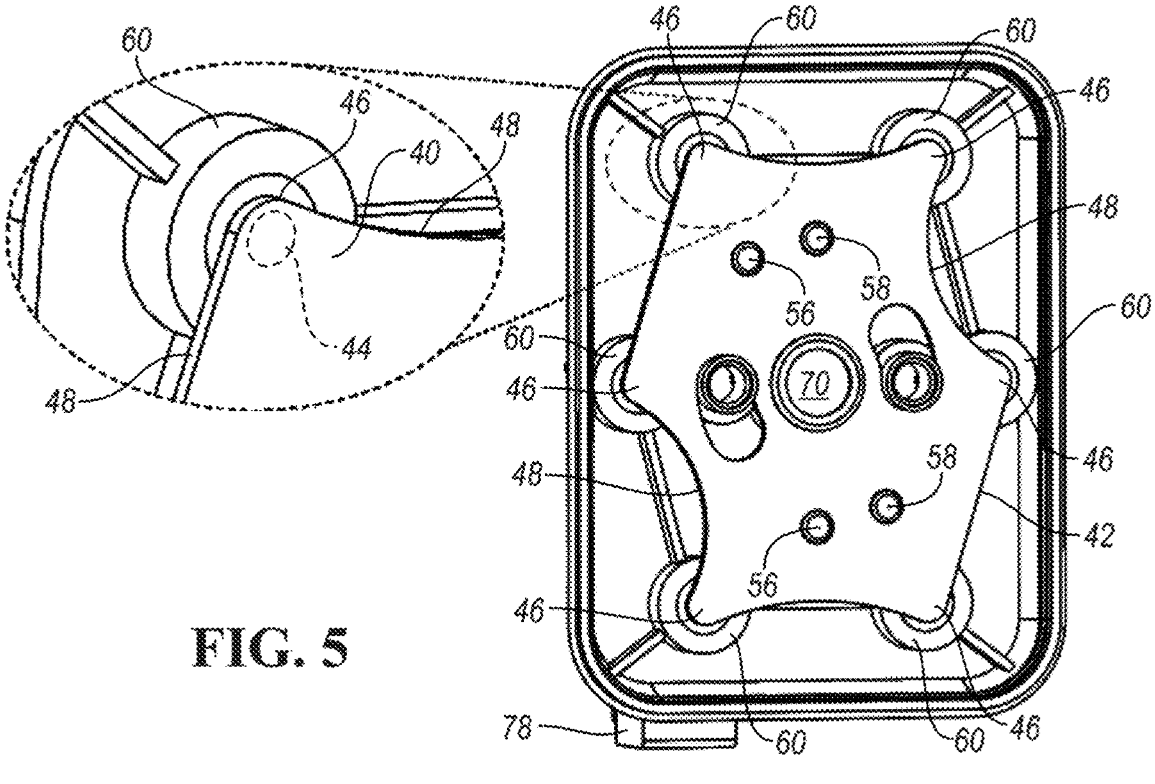
FIG. 5 the isolation ground switch in the closed position with the back housing removed.

As illustrated in FIGS. 3-5 the switch plate 40 has a plurality of contact points 44 positioned along a periphery 42 of the switch plate 40. One of the contact points 44 along the switch plate 40 contacts each of the conductive projections 36 of the termination studs 24 when the switch plate 40 moves to the closed position. The contact points 44 may be formed on a forward surface of the switch plate 40 and may be coplanar with the switch plate 40. Alternatively, the contact points 44 may be raised or project from the forward surface.

The switch plate 40 deflects at each of the contact points 44 when contacting a corresponding conductive projection 36. The spring force from the deflected switch plate 40 ensures the contact points 44 on the switch plate 40 maintain conductive contact with the conductive projections 36 on the termination studs 24 in the closed position.

The contact points 44 may be positioned along a plurality of tabs 46 along the periphery 42 of the switch plate 40. The tabs 46 project radially from adjacent peripheral edges 48. The tabs 46 deflect out of the plane in which the switch plate 40 rotates when contacting a corresponding conductive projection 36. At least some of the peripheral edges 48 may be concave between the tabs 46 to provide clearance and prevent the switch plate 40 from contacting the conductive projections 36 in the open positions.

The switch plate 40 has two recessed detents that cooperate with a pin 50 projecting into the housing cavity 18. The pin 50 engages the first recessed detent 56 in the fully open position. In the closed position, the pin 50 engages the second recessed detent 58. The pin 50 and detents 56, 58 positively secure the switch plate 40 in the open and closed positions. The pin 50 and detents 56, 58 act as a latching mechanism in the isolated operating state such that an operator must use intentional action and force to actuate the isolation ground switch 10 from the open position to the closed position and operating state.

A rotation hub 70 is connected to the switch plate 40 and extends outside the housing cavity 18 to allow a user to actuate the switch plate 40 between the open and closed positions via the hub 70. As illustrated in FIG. 1, the rotation hub 70 extends through an opening 72 defined in the front housing 14. The switch plate 40 rotates about a central axis of the hub 70. The rotation hub 70 may be a bolt connected to the switch plate 40 with threads. The hub 70 may also include a handle to provide better grip and allow a user to easily rotate the hub 70, thereby rotating the switch plate 40.

The hub 70 may be permanently affixed to the switch plate 40. As illustrated in FIG. 2, the hub 70 may include partial hex rivet nut 80 disposed in the cavity 18. The hex rivet nut 80 ensures the hub 70 can meet anticipated torsional forces required to actuate the switch plate 40.

The isolation switch 10 also has a ground lug 78. The ground lug 78 may be formed of a brass alloy and have a wire retention screw. The ground lug 78 may be connect to one of the termination studs 24 with a nut 26 and washer 28.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An isolation ground switch comprising:

a housing having a front housing portion and a back housing portion defining a housing cavity therebetween;

a conductive switch plate positioned in the housing cavity and rotatable between a closed position and an open position, wherein the switch plate has a plurality of tabs positioned along a periphery of the switch plate, and wherein peripheral edges are concave between the tabs; and a plurality of termination studs extending forward from the front housing portion, each termination stud having a conductive projection extending into the housing cavity from the front housing portion, wherein one of the termination studs contacts one of the tabs when the switch plate rotates to the closed position wherein at least one of the plurality of termination studs is connected to a ground lug, wherein the conductive projection of each of the plurality of termination studs engage one of the contact points on the forward surface of the switch plate when the switch plate rotates to the closed position in which the switch is in a grounded state, and wherein when the switch plate rotates to the open position, the switch plate does not contact any of the plurality of termination studs so each of the plurality of termination studs is conductively isolated.

2. The switch of claim 1, further comprising a rotation hub connected to the switch plate and extending outside the housing cavity to allow a user to rotate the switch plate between the open and closed positions.

3. The switch of claim 2, wherein the rotation hub extends through an opening defined in the front housing portion.

4. The switch of claim 2, wherein the rotation hub is connected to the switch plate such that the switch plate and the rotation hub rotate about a central axis.

5. The switch of claim 1, wherein the conductive switch plate rotates relative to the housing in a first rotation direction toward the open position and in a second rotation direction opposite the first rotation direction toward the closed position.

6. The switch of claim 1, wherein the conductive projection of each of the termination studs has a tapered edge adjacent a planar distal end parallel to the plane in which the switch plate rotates.

7. The switch of claim 1, wherein each of the tabs contact one of the termination studs when the switch plate rotates to the closed position.

8. An isolation ground switch comprising:

a housing having a front housing portion and a back housing portion defining a housing cavity therebetween;

a conductive switch plate positioned in the housing cavity and moveable between a closed position and an open position, the conductive switch plate having a plurality of contact points positioned along a forward surface of the switch plate; and a plurality of termination studs mounted to the front housing portion and wherein at least one termination stud is connected to ground, each termination stud having a conductive projection extending rearward into the housing cavity from the front housing portion, wherein in the closed position of the switch plate, all of the contact points of the switch plate are in contact with at least one of the conductive projections of the plurality of termination studs such that the switch is in a grounded state, and when the switch plate moves to the open position, the switch plate does not contact any of the contact points of the plurality of termination studs such that each of the termination studs is conductively isolated, wherein the switch plate has two recessed detents and the front housing portion has a pin projecting into the housing cavity, the pin engaging a first recessed detent in the open position and engaging a second recessed detent in the closed position to positively secure the switch plate in the open and closed positions.

9. The switch of claim 8, wherein the conductive projection of each termination stud projects into the housing cavity such that the conductive projection intersects a plane in which the switch plate rotates, wherein the switch plate deflects out of the plane when contacting a corresponding conductive projection, thereby creating a spring force to ensure the contact points maintain contact with the conductive projections in the closed position.

10. The switch of claim 8, wherein the contact points comprise a plurality of tabs defined along a periphery of the switch plate and project radially from adjacent peripheral edges, and wherein the peripheral edges are concave between the tabs.

11. The switch of claim 8, wherein the conductive projection of each termination stud has a tapered edge adjacent a planar distal end parallel to the forward surface of the switch plate.

12. The switch of claim 8, wherein at least one of the termination studs is connected to ground via a ground lug.

13. The switch of claim 8, wherein the conductive switch plate rotates relative to the housing in a first rotation direction toward the open position and in a second rotation direction opposite the first rotation direction toward the closed position.

14. The switch of claim 8, wherein the conductive switch plate is rotatable between only two operable positions, the closed position where the switch is in a grounded state, and the open position where the switch is conductively isolated.

15. An isolation ground switch comprising:

a housing having a front housing portion and a back housing portion defining a housing cavity therebetween, the housing having a plurality of termination studs integrally formed with the front housing portion, each termination stud having a conductive projection extending through the front housing portion into the housing cavity, wherein at least one of the conductive projections is connected to a ground lug positioned on the housing; and a conductive switch plate positioned in the housing cavity and moveable between a closed position defining a grounded state and an open position defining an isolated state, wherein the conductive projection of all of the termination studs contact the switch plate when the switch plate moves to the closed position, and when the switch plate moves to the open position, none of the conductive projections on the termination studs contact the switch plate so each termination stud is conductively isolated, wherein the conductive projection of each termination stud has a tapered edge adjacent a planar distal end parallel to a plane in which the switch plate moves, wherein all of the termination studs are in contact with the switch plate in the closed position, and wherein in the open position, none of the termination studs are in contact with the switch plate.

16. The switch of claim 15, wherein the conductive projection is insert molded with the front housing portion.

17. The switch of claim 16, wherein the termination studs are a conductive material and insert-molded with a non-conductive material to form the front housing portion.

18. The switch of claim 15, wherein the conductive projection of each termination stud projects into the housing cavity such that the conductive projection intersects a plane in which the switch plate rotates, wherein the switch plate from the plane when contacting a corresponding conductive projection, thereby creating a spring force to ensure the contact points maintain contact with the conductive projections in the closed position.

19. The switch of claim 15, wherein the switch plate is rotatable about a central axis extending through the front and back housing portions.

* * * * *